(12) United States Patent
Fujioka

(10) Patent No.: US 9,475,219 B2
(45) Date of Patent: Oct. 25, 2016

(54) METHOD FOR MOLDING FOAMABLE RESIN

(75) Inventor: Toshiyuki Fujioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 769 days.

(21) Appl. No.: 13/634,435

(22) PCT Filed: Apr. 11, 2011

(86) PCT No.: PCT/JP2011/002111
§ 371 (c)(1),
(2), (4) Date: Sep. 12, 2012

(87) PCT Pub. No.: WO2011/158414
PCT Pub. Date: Dec. 22, 2011

(65) Prior Publication Data
US 2013/0001818 A1    Jan. 3, 2013

(30) Foreign Application Priority Data

Jun. 15, 2010 (JP) ................. 2010-135640

(51) Int. Cl.
*B27N 3/10* (2006.01)
*B29C 44/04* (2006.01)

(52) U.S. Cl.
CPC ....... *B29C 44/0446* (2013.01); *B29C 44/0407* (2013.01)

(58) Field of Classification Search
CPC .................. B29C 44/0407; B29C 44/0446
USPC .......................................... 264/45.5; 425/542
See application file for complete search history.

(56) References Cited

FOREIGN PATENT DOCUMENTS

| CN | 101157265 | 4/2008 |
|---|---|---|
| JP | 7-308975 | 11/1995 |
| JP | 7-314579 | 12/1995 |
| JP | 2002-67111 | 3/2002 |
| JP | 2009-66952 | 4/2009 |
| JP | 2009-66953 | 4/2009 |
| JP | 2009-95982 | 5/2009 |
| JP | 2009-96109 | 5/2009 |
| JP | 2009-154308 | 7/2009 |
| JP | 2010-30226 | 2/2010 |

*Primary Examiner* — Joseph S. Del Sole
*Assistant Examiner* — John Robitaille
(74) *Attorney, Agent, or Firm* — Hamre, Schumann, Mueller & Larson, P.C.

(57) ABSTRACT

Before generated air bubbles grow, only the edge of a portion where strength is not to be reduced is locally cooled and solidified to form a wall of fluid. After that, a pin (107) or the like is pressed into a molten resin portion inside the edge to reduce the volume of a cavity (3), thereby reducing the size of generated bubbles. Alternatively, foaming gas is absorbed into resin so as to reduce the volume of generated air bubbles. Thus, a reduction in strength is suppressed.

2 Claims, 8 Drawing Sheets

FIG. 3
(a) 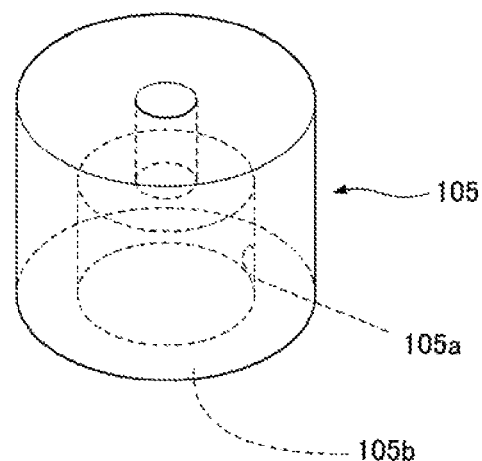
(b) 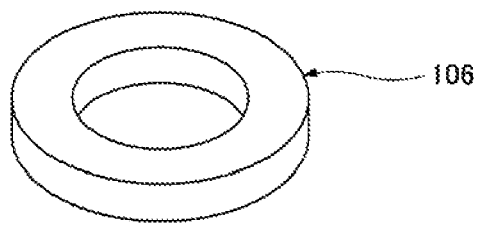

F I G. 5
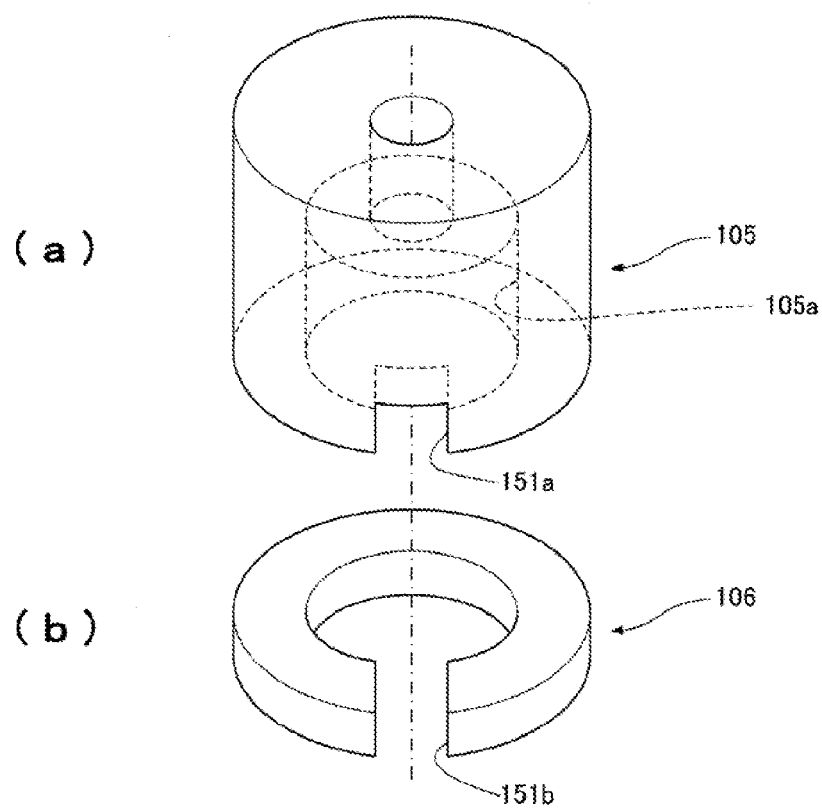
F I G. 6
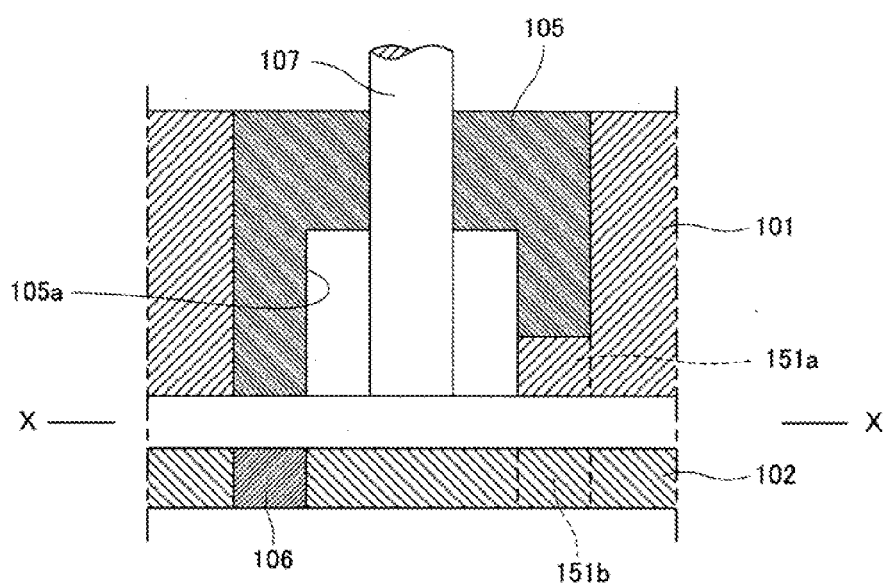

METHOD FOR MOLDING FOAMABLE RESIN

TECHNICAL FIELD

The present invention relates to foamable resin molding.

BACKGROUND ART

Foamable resin molding with foamable resin injected into a mold can reduce the weight and materials of a molded article because of the use of the foamable resin. Unfortunately, the foamable resin molding may reduce the strength of the molded article, which is a problem in practical use.

In order to address this problem, Patent Literature 1 describes a molding method in which a mold surface is cooled to defoam the surface of a molded article, thereby suppressing a reduction in strength.

In FIGS. 10(a) and 10(b), a cavity 42 formed by a stationary mold 31 and a movable mold 32 is filled with foamable resin R. The outer edge of the stationary mold 31 includes a groove 31a that forms an attaching portion Xb.

In FIG. 10(c), the movable mold 32 undergoes a coreback operation in the direction of an arrow, that is a direction along which the volume of the cavity 42 increases. Reference character Ra denotes foam cells and reference character Xc denotes a skin layer having a small porosity. The attaching portion Xb is formed continuously to the body of a molded article.

In the step of producing the molded article, the foamable resin R disposed in the groove 31a of the stationary mold 31 has a relatively small volume and thus is quickly cooled and solidified on a surface of the stationary mold 31 around room temperature, suppressing a reduction in pressure. Thus, the attaching portion Xb is formed with suppressed growth of the foam cells Ra.

CITATION LIST

Patent Literature

Patent Literature 1: Japanese Patent Laid-Open. No. 2009-096109

SUMMARY OF INVENTION

Technical Problem

In the method for molding foamable resin, however, cooling on the surface of the mold allows defoaming only to a thickness of 1 mm or less of resin facing the surface of the mold, hardly suppressing a reduction in strength. Alternatively, the size of an application area is limited under the current circumstances.

An object of the present invention is to provide a method for molding foamable resin which can produce a molded article with a small reduction in strength.

Solution to Problem

A method for molding foamable resin according to the present invention, when foamable resin is injected into a cavity formed by a first mold and a second mold and the resin is foamed, the method including: disposing a nest as a part of a surface of the cavity, the nest being set at a temperature lower than the set temperature of one of the first mold and the second mold; injecting molten resin into the cavity and solidifying the resin on the nest more quickly than on the surface of the cavity other than a contact area with the nest; and compressing the molten resin in the recessed portion of the nest after solidifying the molten resin in the recessed portion of the nest, the recessed portion communicating with the cavity.

A mold for molding foamable resin according to the present invention is a mold for molding foamable resin in which foamable resin is injected into a cavity formed by a first mold and a second mold and the resin is foamed, the mold including: a frame-like nest that is set at a temperature lower than the set temperature of one of the first mold and the second mold, is disposed as a part of a surface of the cavity, and has a recessed portion communicating with the cavity; and a movable core that is pressed into the recessed portion of the nest to compress molten resin in the nest.

A mold for molding foamable resin according to the present invention is a mold for molding foamable resin in which foamable resin is injected into a cavity formed by a first mold and a second mold and the resin is foamed, the mold including: a frame-like first nest that is set at a temperature lower than the set temperature of the first mold, is disposed as a part of a surface of the cavity, and has a recessed portion communicating with the cavity; a second nest that is disposed in the second mold so as to be opposed to the first nest as a part of a surface of the cavity, and is set at a temperature lower than the set temperature of the second mold; and a movable core that is pressed into the recessed portion of the first nest to compress molten resin in the first nest.

Advantageous Effects of Invention

According to this configuration, the nest is disposed in a portion that forms a part requiring strength in the cavity formed by the first mold and the second mold in a molded article. After molten resin is injected into the cavity, the resin on the nest is cured more quickly than on other portions, a wall of the cured resin is formed to prevent the passage of the molten resin in the recessed portion of the nest, and then the molten resin in the recessed portion of the nest is compressed, thereby reducing the size of generated air bubbles. Alternatively, foaming gas is absorbed into the resin so as to reduce the volume of generated air bubbles. Thus, foamable resin molding can be achieved that reduces the weight of a molded article and the amount of used resin while ensuring necessary strength.

BRIEF DESCRIPTION OF DRAWINGS

FIG. 3 illustrates perspective views of first and second nests 105 and 106 according to the first embodiment.

FIG. 5 illustrates perspective views of first and second nests 105 and 106 according to a second embodiment of the present invention.

FIG. 6 is a cross-sectional view illustrating a closed state according to the second embodiment.

DESCRIPTION OF EMBODIMENTS

Figure 1:
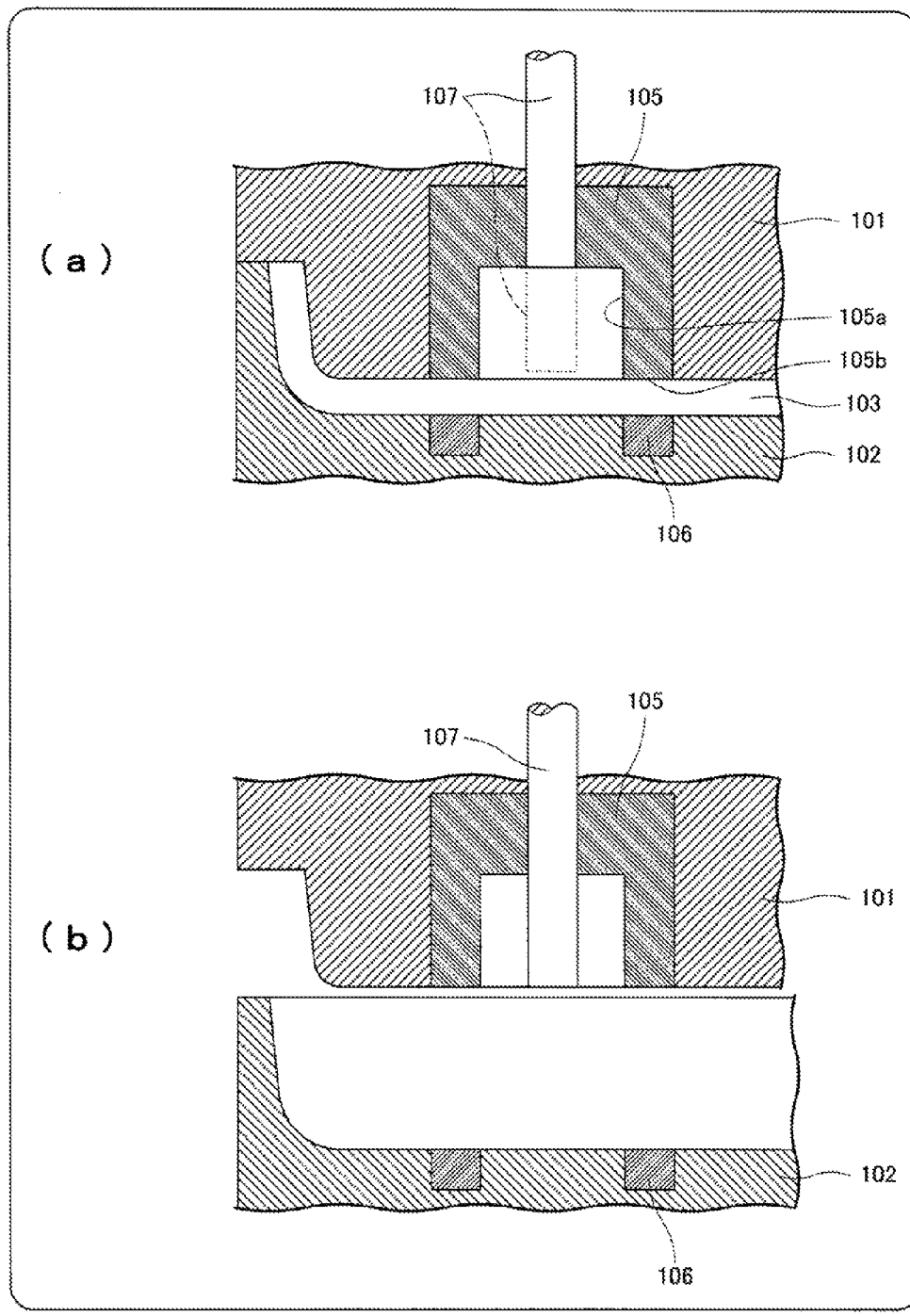
FIG. 1 illustrates cross-sectional views of a closed state and an opened state of a mold for molding foamable resin according to a first embodiment of the present invention.

A method for molding foamable resin according to the present invention will be described below with reference to specific embodiments.

First Embodiment

FIGS. 1(a) and 1(b) illustrate an opened state and a closed state of a mold for molding foamable resin according to a first embodiment of the present invention. FIG. 2 illustrates a molded article 131 to be produced.

The mold for molding foamable resin has a cavity 103 formed between a first mold 101 and a second mold 102.

The first mold 101 includes a first nest 105 disposed on the cavity. As illustrated in FIG. 3(a), the first nest 105 has a recessed portion 105a communicating with the cavity 103 and an opening end 105b constituting a part of a surface of the cavity 103.

As illustrated in FIG. 3(b), the second mold 102 includes a circular second nest 106 disposed on the cavity. The second nest 106 is opposed to the first nest 105 and constitutes a part of a surface of the cavity 103.

The first and second nests 105 and 106 are regulated to temperatures lower than those of the first and second molds 101 and 102. Furthermore, the first nest 105 includes a movable pin 107 serving as a movable core that expands and contracts relative to the interior of the recessed portion 105a. The movable pin 107 is regulated to a temperature lower than that of the first mold 101.

The first and second nests 105 and 106 and the movable pin 107 are regulated to temperatures lower than those of the first and second molds 101 and 102 by, for example, cooling with cooling media such as air and water or indirect cooling with a heat pipe.

A method for molding foamable resin with the mold for molding foamable resin includes steps illustrated in FIGS. 4(a) to 4(e).

Figure 4:
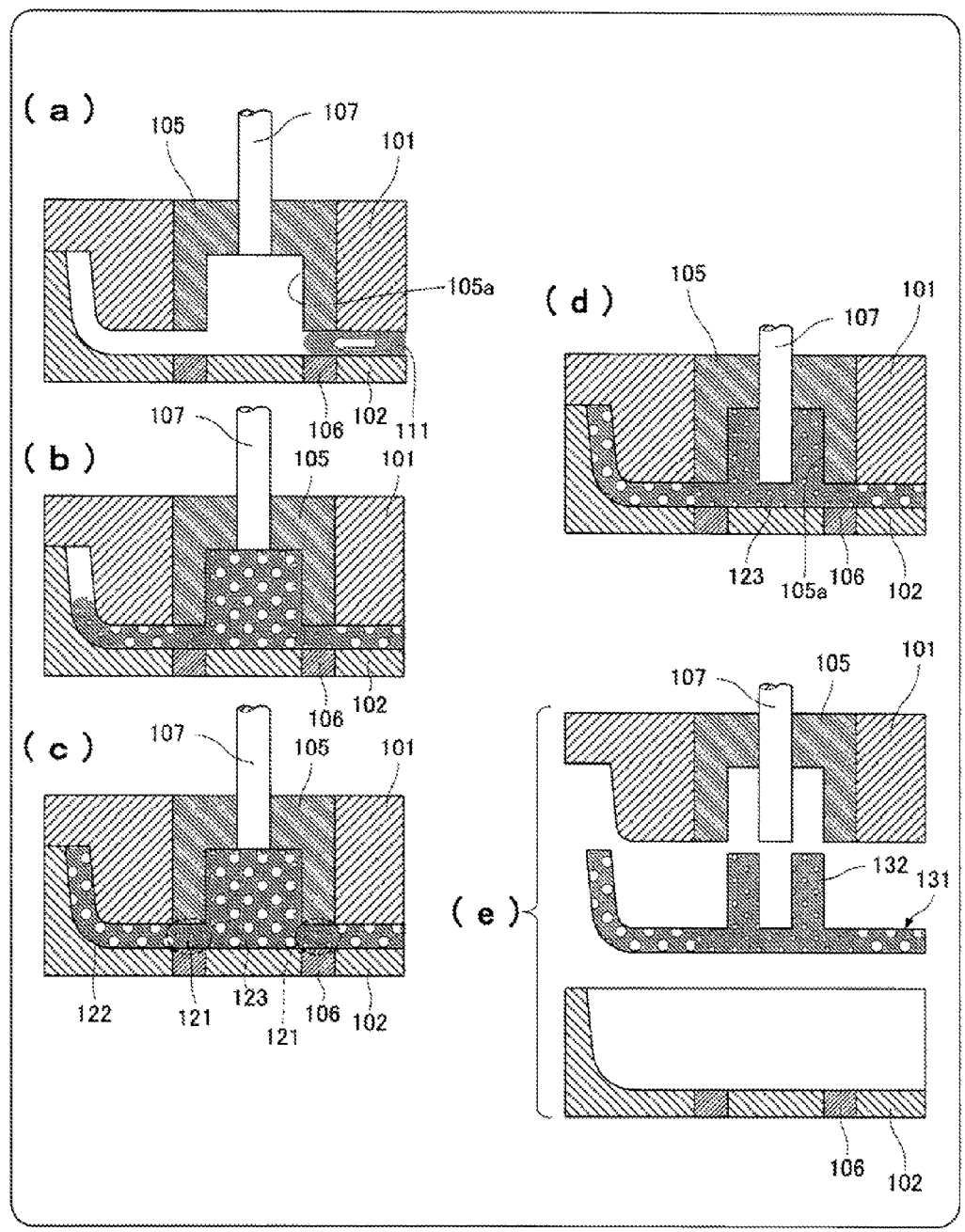
FIG. 4 illustrates molding process drawings according to the first embodiment.

First, as illustrated in FIG. 4(a), foamable molten resin 111 is injected into the cavity 103 formed by closing the first mold 101 and the second mold 102, in a state in which the movable pin 107 is retracted from the recessed portion 105a.

The injected foamable molten resin 111 containing foaming gas foams by itself, resulting in a larger volume. Thus, as illustrated in FIG. 4(b), the foamable molten resin 111 expands to the end of the cavity 103. White circles represent generated air bubbles of different sizes.

At this point, growing air bubbles flow over the molded article. As illustrated in FIG. 4(c), molten resin in an initial solidified portion 121 facing the first nest 105 and the second nest 106 is more quickly cooled and solidified than in other portions, so that the solidification hardly grows air bubbles.

The initial solidified portion 121 is cooled and solidified between the first nest 105 and the second nest 106 and acts as a wall of a molten resin flow between a final solidified portion 122 that is in a molten state on the end of the cavity 103 and a final solidified portion 123 that is in a molten state in the recessed portion 105a of the first nest 105.

The wall of the solidified flow is a frame-like wall that reduces flowability. Thus, the resin may be injected from the periphery of the frame-like wall.

After the resin of the initial solidified portion 121 is cured to form the wall, as illustrated in FIG. 4(d), the movable pin 107 is inserted into the recessed portion 105a of the first nest 105 to reduce the volume of the cavity 103 and compress the molten resin 111 of the final solidified portion 123 in a molten state.

Hence, a reduction in the volume of the molten resin 111 in the final solidified portion 123 generates smaller air bubbles, or the absorption of foaming gas into the resin reduces the volume of generated air bubbles.

After that, as illustrated in FIG. 4(e) the first mold 101 and the second mold 102 are opened in a state in which the final solidified portion 122 and the final solidified portion 123 are cooled and solidified. The removed molded article 131 has a boss portion 132 where the volume of generated air bubbles is smaller than those of other portions.

In the case where the molded article is an outer case for an electrical appliance, the boss portion 132 formed on the molded article 131 is applicable as a press-fit point for a self-tapping screw or a pin for mounting a variety of electronic circuit boards.

The density of resin continuously changes from the portion containing a small volume of air bubbles to the portion containing a large volume of air bubbles. Thus, even on the boss portion where a stress concentration is likely to occur because of its shape, the stress concentration is reduced and the strength is increased.

Hence, unlike in a conventional foamable resin molded article, a portion containing a small volume of generated air bubbles in the boss portion 132 is equal in strength to a typical molded article free of air bubbles. Since the strength is not reduced, the practicability of foamable resin molding can be remarkably improved.

The first nest 105, the second nest 106, and the movable pin 107 are made of materials having higher thermal conductivity than the first mold 101 and the second mold 102, e.g., a copper alloy and a super-hard material, considerably extracting heat. Thus, the effect is further improved. A clearance between the first nest 105 and the second nest 106 and between the first mold 101 and the second mold 102 is preferably provided to increase a temperature difference.

Second Embodiment

Figure 7:
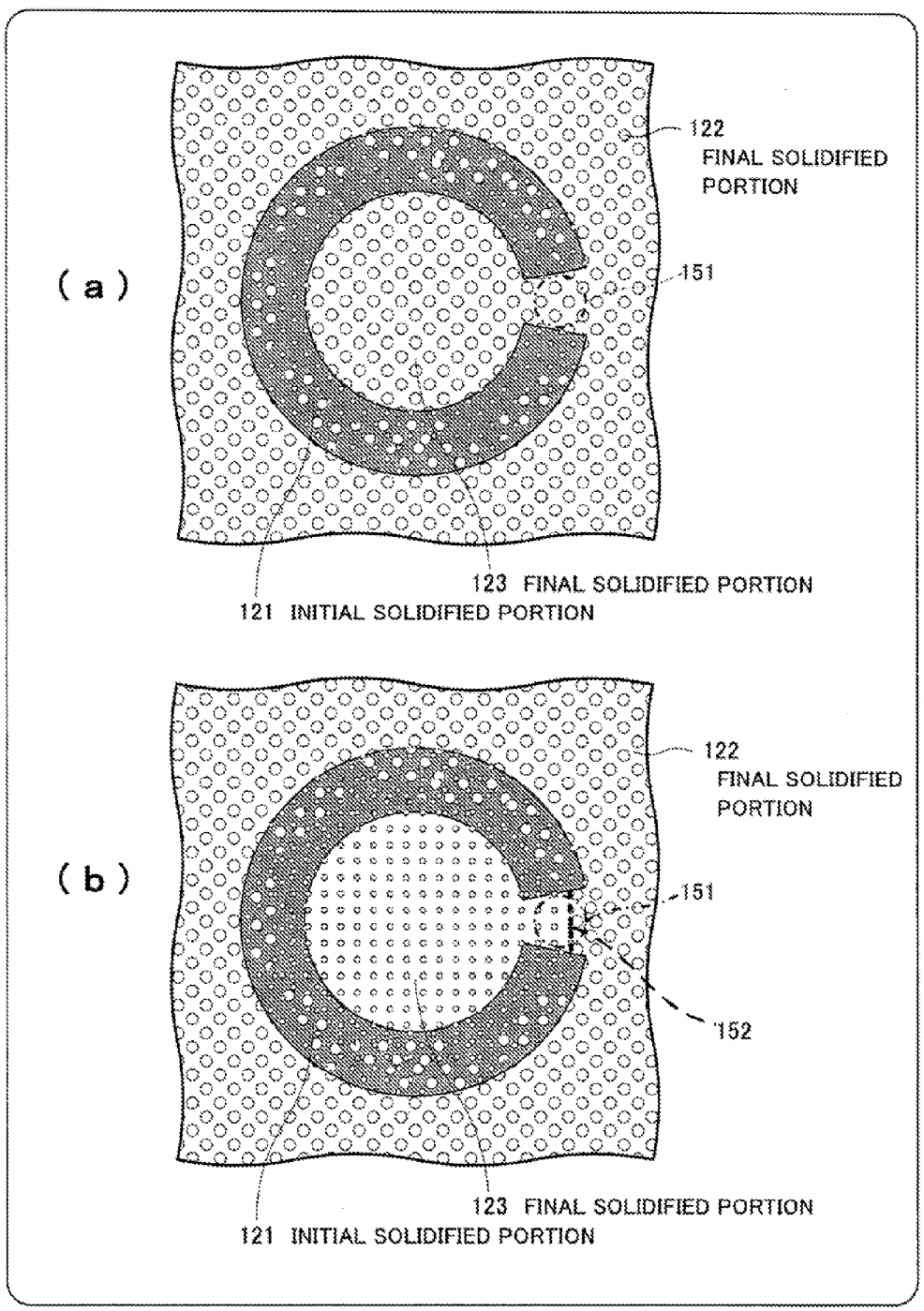
FIG. 7 illustrates cross-sectional views before and after a pressure is applied by a movable pin 107, taken along the line X-X of FIG. 5.

FIGS. 5 to 7 illustrate a second embodiment.

As illustrated in FIG. 3(a), the ring-shaped opening end 105b of the first nest 105 according to the first embodiment is entirely exposed on the surface of the cavity 103. As illustrated in FIG. 3(b), the ring-shaped second nest 106 is entirely exposed on the surface of the cavity 103. In the second embodiment, the shapes of first and second nests 105 and 106 are changed as illustrated in FIGS. 5(a) and 5(b).

The first nest 105 in FIG. 5(a) includes an opening end 105b having a notch 151a. The second nest 106 in FIG. 5(b) has a notch 151b at a point opposed to the notch 151a of the first nest 105. In FIG. 6, the first nest 105 having the notch 151a and the second nest 106 having the notch 151b are assembled into first and second molds 101 and 102. As illustrated in FIG. 6, in a state in which the first and second nests 105 and 106 are assembled into the first and second molds 101 and 102, the first mold 101 is partially fit into the notch 151a of the first nest 105. Moreover, the second mold 102 is partially fit into the notch 151b of the second nest 106. Other configurations are identical to those of the first embodiment.

The roles of the notch 151a of the first nest 105 and the first mold 1 fit into the notch 151a will be described below.

In the case of the first embodiment in which the first nest 105 does not have the notch 151a, as illustrated in FIG. 4(d), the movable pin 107 is pressed into the final solidified portion 123 so as to compress the cavity 103 after the initial solidified portion 121 is formed, thereby applying a pressure to the final solidified portion 123 so as to reduce the size of generated air bubbles. Alternatively, foaming gas is absorbed into resin so as to reduce the volume of generated air bubbles. Like a boss portion 132b on the right side of FIG. 2, in the case where a center hole having a larger diameter than that of a boss portion 132a on the left side is necessary, the movable pin 107 increased in diameter is pressed into the recessed portion 105a, excessively increasing a pressure in the final solidified portion 123 so as to break the initial solidified portion 121 acting as a wall of fluid. This may allow the passage of molten resin between the final solidified portion 122 and the final solidified portion 123. Thus, the final solidified portion 123 may have an insufficient pressure and contain cured resin while leaving air bubbles insufficiently reduced in size in the resin of the boss portion 132b. Thus, the boss portion 132b is not strong enough.

In contrast, in the case where the opening end 105b of the first nest 105 includes the notch 151a and the first mold 1 is fit into the notch 151a as illustrated in FIG. 6, the resin of the initial solidified portion 121 can be partially softened by heat from the first mold 1 fit into the notch 151a.

FIG. 7(a) illustrates a cured state of resin before the movable pin 107 is pressed into the recessed portion 105a. At this point, the resin interposed between the first and second nests 105 and 106 is cured as the initial solidified portion 121 except for a portion in the notch 151a, in a cross-sectional view taken along the line X-X of FIG. 6. Molten resin in and on the recessed portion 105a foams by itself and rises ins volume.

The movable pin 107 is then pressed to apply a pressure to the foamable resin in the recessed portion 105a. Thus, as illustrated in FIG. 7(b), the volume of molten resin 111 decreases in the final solidified portion 123, reducing the size of generated air bubbles. Alternatively, foaming gas is absorbed into the resin so as to reduce the volume of generated air bubbles. A pressure applied in the recessed portion 105a partially expands the resin in the final solidified portion 123 from the gap of a notch 151 to the outside of the recessed portion 105a, thereby preventing a pressure in the recessed portion 105a from rising more than necessary. A broken line 152 in FIG. 7(b) represents a boundary between resin containing large air bubbles in the final solidified portion 122 outside the recessed portion 105a and foamable resin containing air bubbles reduced in size by a pressure of the movable pin 107 or air bubbles reduced in volume in the recessed portion 105a. The notch 151a containing flowing resin is a small gap on the opening end 105b of the first nest 105 and thus an orifice effect increases the pressure of the resin, reducing the size of air bubbles than in the final solidified portion 122. Thus, high strength can be maintained.

As has been discussed, even in the case where the boss portion 132b has a larger center hole than the boss portion 132a and the movable pin 107 is larger in diameter than the boss portion, a wall of fluid in the initial solidified portion 121 can be prevented from being broken.

Third Embodiment

Figure 8:
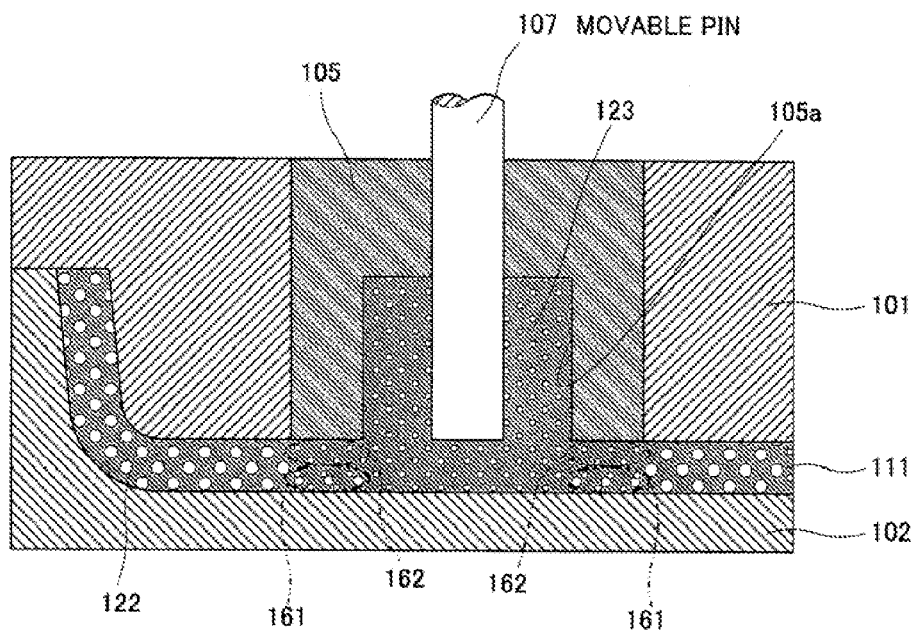
FIG. 8 is a cross-sectional view illustrating a closed state according to a third embodiment of the present invention.

FIG. 8 illustrates a third embodiment of the present invention.

In the second embodiment, the first nest 105 including the notch 151a is provided in the first mold 101 and the second nest 106 including the notch 151b is provided in the second mold 102, whereas in the third embodiment, a second mold 102 does not include a second nest 106. Other configurations are identical to those of the first embodiment.

In the case where the second mold 102 does not include the second nest 106, a resin flowing portion 161, which is an uncured portion allowing the passage of resin, can be slightly left in a part of a frame-like initial solidified portion 162 surrounding a part of a molded article.

Thus, when a movable pin 107 is pressed so as to apply at least a certain pressure in a final solidified portion 123, resin flows from the final solidified portion 123 to a final solidified portion 122 and does not excessively rise in pressure in the final solidified portion 123, thereby preventing a wall of fluid in the initial solidified portion 162 from being broken.

The flowing resin in the resin flowing portion 161 is smaller in thickness than the initial solidified portion 162. Thus, the pressure of the resin is increased by an orifice effect and air bubbles in the resin flowing portion 161 are smaller than those of the final solidified portion 122, keeping high strength. This method generates large air bubbles in the final solidified portion 122, medium air bubbles in the resin flowing portion 161, and small air bubbles in the initial solidified portion 162. Fine air bubbles are generated at the base of a boss in the thickness direction, so that the boss can have required strength.

Hence, unlike in a conventional foamable resin molded article, a portion containing a small volume of generated air bubbles in the boss portion 132 (FIG. 2) is equal in strength to a typical molded article free of air bubbles. Since the strength is not reduced, the practicability of foamable resin molding can be remarkably improved.

Fourth Embodiment

Figure 9:
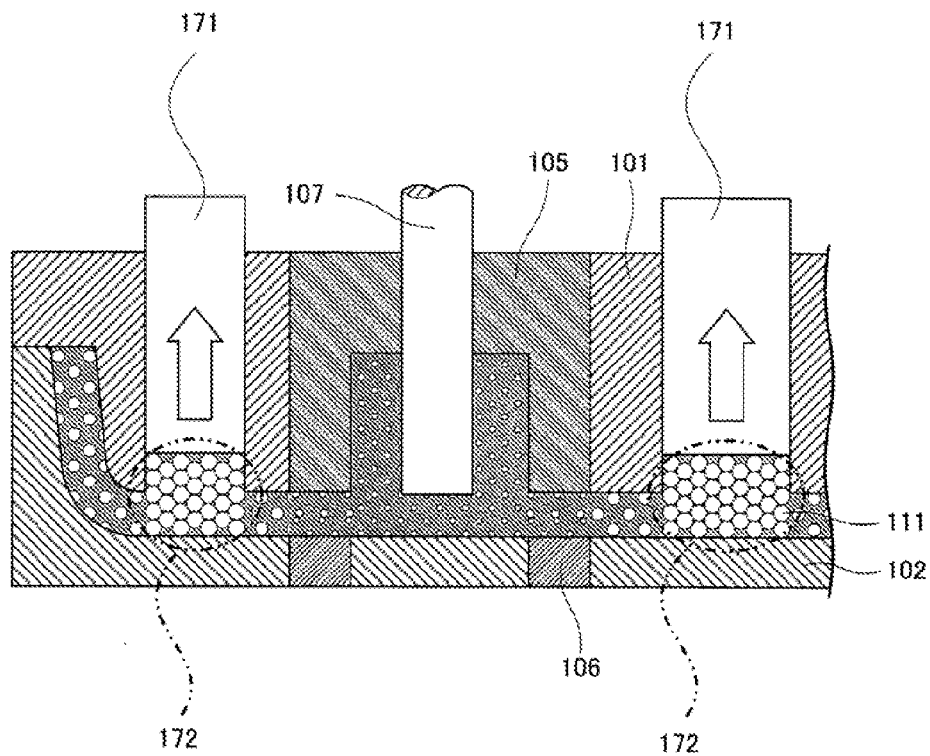
FIG. 9 is a cross-sectional view illustrating a closed state according to a fourth embodiment of the present invention.
Figure 10:
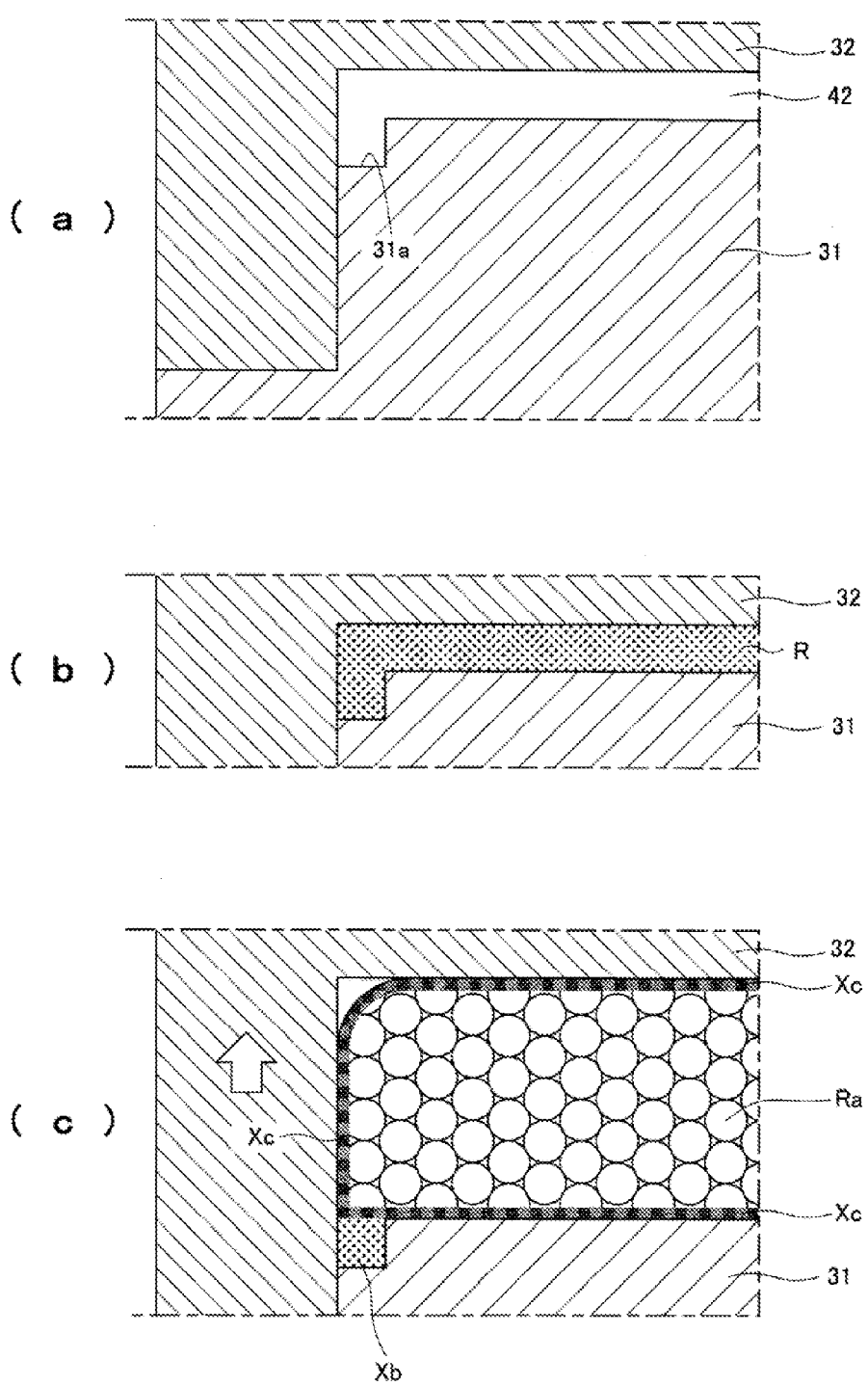
FIG. 10 illustrates molding process drawings according to the related art.

FIG. 9 illustrates a fourth embodiment of the present invention.

Figure 2:
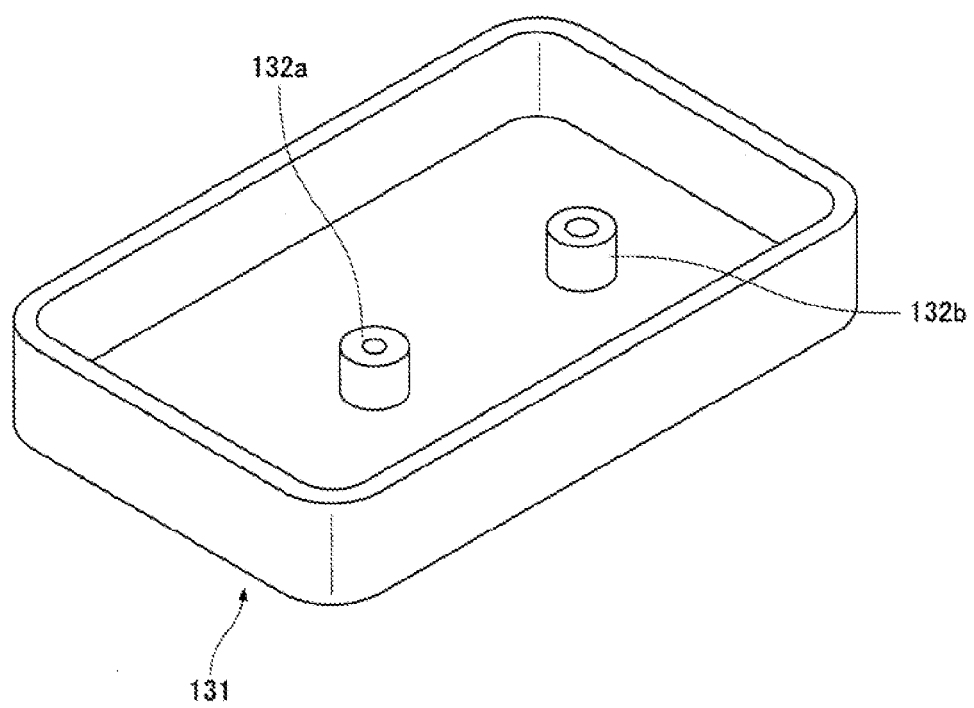
FIG. 2 is a perspective view of a molded article 131 produced according to the first embodiment.

In the fourth embodiment, the first mold 101 according to the first embodiment in FIG. 1 includes a movable core 171. A final solidified portion 122 in a molten state moves the movable core 171 backward in the directions of arrows. Thus, the volume of a cavity 103 increases and a pressure partially decreases in the cavity 103, forming a highly foaming portion 172. Other configurations are identical to those of the first embodiment.

Hence, a normal foaming portion formed only by the foaming force of foamable resin, the highly foaming portion formed by positively reducing a pressure in the cavity, and a high-strength portion containing only a small amount of air bubbles can be formed in a single molded article, achieving the functions of thermal insulation and noise insulation in addition to weight reduction and securing of strength.

In the present embodiment, the movable core 171 is provided in the first mold 101. The movable core 171 may be provided in a second mold 102 so as to move backward when the final solidified portion 122 is in a molten state.

The first embodiment was described in the fourth embodiment. The fourth embodiment can be similarly implemented for the second embodiment and the third embodiment.

INDUSTRIAL APPLICABILITY

According to the present invention, even in the case of a component molded with foamable resin, a boss portion having necessary strength can be integrally formed at a point requiring strength, improving the productivity of a variety of electronic equipment.

REFERENCE SIGNS LIST 101 first mold
102 second mold
105 first nest
105a recessed portion
105b opening end
106 second nest
107 movable pin (movable core)
111 foamable molten resin
121 initial solidified portion
122, 123 final solidified portion
131 molded article
132a, 132b boss portion
151a, 151b notch
161 resin flowing portion
171 movable core
172 highly foaming portion

The invention claimed is:

1. A method for molding foamable resin, when foamable resin is injected into a cavity formed by a first mold and a second mold and the resin is foamed, the method comprising:

disposing a frame-like nest as a part of a surface of the cavity, the nest being set at a temperature lower than a set temperature of one of the first mold and the second mold and having a recessed portion communicating with the cavity;

injecting molten foamable resin into the cavity, and solidifying the resin on the nest more quickly than on an area other than a contact area with the nest so as to form an initial solidified portion acting as a barrier of a molten resin flow, the initial solidified portion being disposed upstream and downstream of the recessed portion relative to the flow of the molten resin, and foaming of unsolidified foamable resin continuing after the initial solidified portion is formed; and compressing the molten resin in a final solidified portion in the recessed portion so as to reduce a volume of generated gas bubbles in the resin in the final solidified portion, and the resin then being solidified by cooling, by pressing a movable core into unsolidified resin in the recessed portion after solidifying the resin in the initial solidified portion, the movable core being set at a temperature lower than the set temperature of one of the first mold and the second mold.

2. The method for molding foamable resin according to claim 1, wherein the frame-like nest includes an opening end having a notch.

* * * * *